United States Patent [19]
Koike

[11] Patent Number: 5,542,017
[45] Date of Patent: Jul. 30, 1996

[54] LIGHT SCATTERING LIGHT GUIDE AND APPLIED OPTICAL APPARATUSES

[76] Inventor: Yasuhiro Koike, 534-23, Ichigao-cho, Midori-ku Yokohama-shi Kanagawa, 225, Japan

[21] Appl. No.: 64,175

[22] PCT Filed: Sep. 25, 1992

[86] PCT No.: PCT/JP92/01230

§ 371 Date: May 25, 1993

§ 102(e) Date: May 25, 1993

[87] PCT Pub. No.: WO93/06509

PCT Pub. Date: Apr. 1, 1993

[30] Foreign Application Priority Data

Sep. 27, 1991 [JP] Japan ................................... 3-249739
Jan. 20, 1992 [JP] Japan ....................................... 4-7896

[51] Int. Cl.[6] ................................................... G02B 6/10
[52] U.S. Cl. ........................... 385/123; 385/901; 385/129; 385/143; 385/146; 362/31; 362/33
[58] Field of Search ........................ 359/48–50; 362/31, 362/32; 385/15, 31, 43, 44, 45, 46, 48, 123, 129, 141, 143, 145, 901, 100, 140, 146

[56] References Cited

U.S. PATENT DOCUMENTS

| 4,294,517 | 10/1981 | Jakubek | 359/50 |
| 4,925,268 | 5/1990 | Iyer et al. | 385/12 |
| 4,989,956 | 2/1991 | Wu et al. | 359/50 |
| 5,050,946 | 9/1991 | Hathaway et al. | 359/50 |
| 5,113,476 | 5/1992 | Okada et al. | 385/140 |
| 5,202,950 | 4/1993 | Arego et al. | 385/129 |

FOREIGN PATENT DOCUMENTS

| 2418781 | 11/1974 | Germany | 385/100 |
| 51-51944 | 5/1976 | Japan . | |
| 255651 | 5/1977 | Japan . | |
| 54-99446 | 8/1979 | Japan . | |
| 25-817923 | 4/1983 | Japan . | |

OTHER PUBLICATIONS

P. Debyr, et al., "Scattering by an Inhomogeneous Solid", Journal of Applied Physics, vol. 20, pp. 517–525, Jan. 1949, New York.
Y. Koike, et al., "Original of Excess Light Scattering in Poly(methyl methacrylate) Glasses", Macromolecules, vol. 22, pp. 1367–1373, Mar. 1989, New Jersey.
Y. Koike, et al., "Light Scattering and Heterogeneities in Low–Loss Poly(methyl Methacrylate) Glasses", Macromolecules, vol. 25, pp. 4807–4815, Mar. 1992, New Jersey.

Primary Examiner—Brian Healy
Assistant Examiner—John Ngo
Attorney, Agent, or Firm—Staas & Halsey

[57] ABSTRACT

A light scattering light guide, which is capable of converting a light flux of a relatively small cross-sectional area into a light flux of a relatively large area with high efficiency and uniformity, manufacturing method thereof, and applied optical apparatuses such as backlight light source apparatuses and light branching/mixing devices which make effective use of the characteristics of said light scattering light guide. Such light scattering light guide is obtained by utilizing various structures with irregular refraction indexes generated in the process of polymerization of organic materials. The values of scattering power (effective scattering irradiation parameter E, etc.) are selected according to applications. The mechanism for forming the structures with irregular refraction indexes by the polymerization process of organic materials is based on, for example, the difference in compatibility, reactivity, density, etc. among the organic materials.

18 Claims, 10 Drawing Sheets

POUR MMA MONOMER IN.
POLYMERIZATION CONTAINER
WEDGE-SHAPED LIGHT SCATTERING LIGHT GUIDE

→ X

SCATTERING INTENSITY DECREASES IN THIS DIRECTION.

LIGHT SCATTERING LIGHT GUIDE AND APPLIED OPTICAL APPARATUSES

TECHNICAL FIELD

The present invention relates to a light scattering light guide, which is capable of radiating scattered light around while guiding light, its manufacturing method and applied optical apparatuses or devices which employ the light scattering light guide.

More particularly, this invention relates to a light scattering light guide, which is capable of converting an incoming light flux having a relatively small cross-sectional area into an outgoing light flux having a relatively large area with high efficiency and uniformity by utilizing an irregular structure produced in the process of polymerization of organic materials, its manufacturing method, and applied optical apparatuses or devices such as light source apparatuses, lighting apparatuses, and light branching apparatuses, which make effective use of the characteristics of the light scattering light guide.

BACKGROUND ART

Conventionally, various types of optical elements or apparatuses, which are designed to guide and scatter incident light at the same time and let it out in multiple directions, have been publicly known.

One type of such known optical elements or apparatuses configures a surface type light source, in which light is allowed to come in through a side of an extending plate-shaped transparent material, with a reflecting element installed on one surface side, and the vicinity of the other surface provided with light diffusivity to obtain a light outgoing surface, thereby enabling the apparatus to be used as a backlight source or the like for a liquid crystal display.

This type includes, for example, those described in the Published Unexamined Japanese Patent Application No. 62-235905, the Published Unexamined Japanese Patent Application No. 63-63083, the Published Unexamined Japanese Patent Application No. 2-13925, and the Published Unexamined Japanese Patent Application No. 2-245787.

In surface type light sources employing those light scattering light guide apparatuses, light scattering is not volumetrically caused inside a transparent body; instead, the light is merely spread in a light outgoing direction by utilizing irregular reflection or mirror reflection in the vicinity of the surface of the transparent body or in a reflecting element, and so, it cannot necessarily be said that such light scattering light guide apparatus is capable of providing a high light diffusivity.

In addition, when an attempt is made to obtain a surface type light source, which receives light from a side and gives uniform illuminance, it is necessary to provide the reflectivity or the like of a reflecting element with some gradient as may be easily understood from the examples shown in the known documents mentioned above. This unavoidably results in a complicated and large (especially thick) structure of the light scattering light guide apparatus.

Accordingly, in using this type of light scattering light guide as the light source or the like of a backlight for a liquid crystal display device, which is required to have a uniform and high illuminance and a thin structure, various additional configuring means are necessary to reinforce light scattering and assure uniform illuminance for a surface type light source. Incorporating such light scattering power reinforcing means, however, used to conflict with the requirement for a thin structure.

Another type of known optical elements or apparatuses has a light diffusing plate which consists of an extending plate-shaped transparent material with a granular substance dispersed therein, the granular substance having a different refraction index from that of the transparent material.

This type includes, for example, those disclosed in the Published Unexamined Japanese Patent Application No. 1-172801, the Published Unexamined Japanese Patent Application No. 1-236257, the Published Unexamined Japanese Patent Application No. 1-269901, the Published Unexamined Japanese Patent Application No. 1-269902, and Published Unexamined Japanese Patent Application No. 2-221925.

The aforesaid Published Unexamined Japanese Patent Application No. 2-221925 discloses a configuration in which light is allowed to let into a light diffusing plate through its side, one surface side being provided with a reflecting element and the other surface functioning as the light outgoing surface, thus configuring a backlight source or the like of a liquid crystal display.

In those light diffusing plates, light scattering is volumetrically caused by nonuniformity in refraction index due to a granular substance dispersed and mixed in the transparent body. In this sense, it can be said that they are capable of improving the light diffusion efficiency in comparison with the aforesaid first type, however, they have the following problems.

They have a drawback such that it is extremely difficult in practice to uniformly disperse a granular substance of a different type in the base substance. This will cause, irregular distribution in an inhomogeneous structure to hinder uniform light diffusion.

For instance, when particles measuring a few microns are mixed in a methylmethacrylate (MMA) monomer for polymerization, uniform light scattering power cannot be obtained because of uneven distribution of particles caused by a difference in density or compatibility. For the same reason, it is also difficult to obtain a structure of highly uniform particle dispersion when particles are incorporated in a polymer such as polymethyl methacrylate (PMMA) at a high temperature.

Besides, the basic unit of the structure with an irregular refraction index that provides light scattering is limited to the granular form; however, this is not desirable from a viewpoint that light scattering is to be caused by uniformly and effectively using the whole volume of a light scattering light guide. Especially, when a surface light source of a relatively large area with a uniform illuminance such as one applicable to the backlight source for a liquid crystal display has to be obtained, the particle dispersion density will become lower, so that the whole of the light scattering light guide will not be able to contribute to uniformity of light scattering. This is not desirable in obtaining highly uniform diffused light.

To distribute the structure with an irregular refraction index throughout the light scattering light guide without changing the light scattering power of the whole light scattering light guide, it can be considered effective to reduce the diameter of the particles to be dispersed and to increase the number of particles. It is not necessarily easy, however, to fix the particle diameter of a specified material to an extremely small value primarily because of the limitation of the manufacturing technology of minute particles. Furthermore, excessively small particle diameter may cause scattering to become dependent on wavelength and resulting undesirable coloring phenomenon.

In the aforesaid Published Unexamined Japanese Patent Application No. 2-221925, PMMA is dissolved in a mixed monomer of MMA and MA (methyl acrylate) to prepare a methacrylate resin syrup. Then an inorganic filler such as glass beads and ground quartz which has a specific gravity exceeding 2 and a different refraction index from the methacrylate resin is dispersed and mixed, and an initiator of polymerization is added to cause polymerization reaction (copolymerization reaction) to take place, thus acquiring a light scattering light guide. In this case, light scattering also practically depends solely on the inorganic filler; therefore, it is not intended at all to generate a structure with an irregular refraction index in the course of the polymerization reaction process. In the combined copolymerization (e.g., 50 wt % methyl methacrylate and 50 wt % ethyl methacrylate, or 50 wt % methyl methacrylate and 50 wt % methyl acrylate) described in the specification of the publication of unexamined JP patent application No. 2-221925, no structure with an irregular refraction index is generated because of an extremely good compatibility. Accordingly, the resin produced from the polymerization reaction functions only as a transparent base material, and does not contribute to light scattering.

Conventionally, various shapes of light scattering light guides are known in addition to a plate-shaped one. For instance, in a light irradiating apparatus used for ocean farming or for the cultivation of chlorella, outgoing light which covers a wide angle range is obtained by providing, for example, a scratched area on the surface of a rod-shaped or linear light guide so that the scratched area will cause light scattering. In such a method, however, scattered light is concentrated on the scratched area, making it difficult to obtain a light flux with an adequate level of uniformity and a large cross-sectional area.

Further, a fiber light guiding means is used to introduce sunlight into a building for the purpose of interior lighting; however, this presently requires expensive and large auxiliary equipment for producing outgoing light fluxes which is good enough to illuminate a large space efficiently and uniformly.

Thus, the publicly known light scattering light guides present various problems such as those described above, and a light scattering light guide which solves those problems has been waited in many optical fields including a field requiring a bright surface type light source with a high level of uniformity, which is typically represented by the backlight source for a liquid crystal display.

DISCLOSURE OF THE INVENTION

An object of the present invention is to provide a light scattering light guide, which is capable of converting a light flux of a relatively small cross-sectional area into a light flux of a relatively large area with high efficiency and uniformity, its manufacturing method, and applied optical apparatuses including backlight source apparatuses and light branching apparatuses, which will make effective use of the characteristics of the light scattering light guide.

The present invention intends to provide a light scattering light guide, which has a structure with an irregular refraction index generated in the process of the polymerization of organic materials, its manufacturing method, and applied optical apparatuses, which will utilize the light scattering light guide having the structure with an irregular refraction index generated in the process of the polymerization of organic materials.

The present invention further provides a light scattering light guide, which has a structure with an irregular refraction index produced in the process of the polymerization of organic materials and a quantitative value of scattering power which is extremely meaningful in practical use.

First, the outline of the principle, on which the light scattering light guide of the present invention can be obtained by forming a structure with an irregular refraction index through the polymerization process of organic materials, will be given.

The present invention intends to configure a light scattering light guide through positive utilization of an irregular structure which is generated by various mechanisms in the process of polymerization. The following illustrates mechanisms that produce the irregular structure:

(1) A small amount of a polymer (which may be oligomer. Hereinafter in this specification, polymers will automatically include oligomers unless otherwise specified) as the second material is dissolved in a monomer which functions as the first material. Under this condition, the individual molecules of the polymer are fully dissolved. Therefore, the mixture takes a form of a uniformly mixed transparent solution, and it does not exhibit light scattering property. The polymerization reaction is started using a means in which a polymerization initiator or the like is added to the mixed solution and they are then heated. When the polymerization reaction progresses until a high conversion rate is reached, if the compatibility between the first material polymer and the second material polymer generated so far is smaller than the compatibility between the second material polymer and the first material monomer, then the second material polymer gradually forms a coagulating structure. If organic materials are selected so that the refraction index substantially differs between the first material polymer and the second material polymer, then a structure with a fluctuating refraction index, that is, a structure with an irregular refraction index, will be generated.

In this case, unlike the prior art in which a granular substance is mixed and dispersed in a monomer for polymerization, or particles are incorporated in a polymer at a high temperature, a condition in which the polymers have been dissolved uniformly at a molecular level before the polymerization is implemented, and the irregular structure is gradually formed; therefore, it is possible to obtain a light scattering light guide wherein the irregular structure is distributed with an extremely high level of uniformity.

Among the embodiments described later, the light scattering light guides of the embodiments 1, 3, 5, 6, 7, 8, and 9 fall under this type.

(2) An appropriate amount of a monomer as the second material is mixed in a monomer as the first material, to cause polymerization reaction. In this case, for example, if materials are selected so that $r_1>1$ will hold for a reactivity ratio $r_1$ of the first material monomer and $r_2<1$ for a reactivity ratio $r_2$ of the second material monomer then the first material monomer will be preferentially polymerized in the process of the polymerization reaction, and the ratio of the unreacted second-material monomer among the monomers, gradually increases. When the majority of the first material monomer has been polymerized, the ratio of the polymerization of the second material monomer starts to increase until the final state where only the polymer from the second material will be generated.

If the compatibility between the first material polymer and the second material polymer is relatively low, then the first material polymer and the second material polymer, the compositions thereof resembling each other, form coagulating structures respectively. If the refraction indexes of both polymers are substantially different, then a structure with an irregular refraction index, in which the refraction index fluctuates, is generated. In this case, too, it is easy to uniformly mix monomers prior to polymerization, with the result that a structure with an irregular refraction index is formed uniformly.

Among the embodiments described later, the light scattering light guide of the embodiment 2 falls under this type.

(3) It is also possible to form a structure with an irregular refraction index when only monomers of single materials are polymerized.

More specifically, if the specific gravity of the monomer is adequately different from that of the polymer, then when polymerization progresses, and the polymer hardens to a certain extent, the portions, which shrink volumetrically when the remaining monomer turns into a polymer, form microvoids. The micro-voids are formed in an extremely large number, and they function as the light scattering centers uniformly distributed three-dimensionally in the polymer, which is obtained as a result of the polymerization reaction, thus providing a light scattering light guide with better characteristics than the conventional light scattering light guide, in which substance particles are dispersed and mixed.

Of the embodiments described later, the light scattering light guide of the embodiment 10 falls under this type.

(4) In a modification of the type (1) described above, it is also possible to select, as the aforesaid second material, a material having a small molecular weight and good compatibility with the first material monomer but lower compatibility with the first material polymer. In this case, too, the same mechanism as that mentioned in (1) above causes the second material (a substance with a small molecular weight) to coagulate, producing an irregular structure. A light scattering light guide can be produced when a combination, wherein the refraction index of the second material is substantially different from that of the first material polymer, is adopted.

There are many substances that can be used as such low-molecular-weight materials. Some examples are diphenyl phthalate, hexaphloro isopropyl terephthalate, diphenyl, and phenyl benzoate.

The present invention is based on the mechanisms explained in (1) through (4) or mechanisms or principles similar to them. The details of the generating mechanisms of the structure with an irregular refraction index (greatly) vary, but, in every case, the present invention is basically characterized by that a structure with an irregular refraction index is intentionally formed through the polymerization process of organic materials, and it is embodied as a light scattering light guide. Accordingly, the mechanisms explained above are just illustrations showing typical examples, and they are not intended to limit the technical scope of the present invention.

In the present invention, it is possible to form a structure with an irregular refraction index through the mechanisms described above, using an extremely wide variety of organic materials in various combinations.

Table 1 and Table 2 show the specific examples of these organic materials. In each table, the material names are given in terms of monomers; however, the refraction index values are given in terms of polymers since polymers eventually configure the structures with irregular refraction indexes.

For instance, those with relatively low refraction indexes are shown for MA, A, etc., while those with relatively high refraction indexes are given for XMA, XA, etc.; therefore, materials are selected from the groups, primarily based on a difference in compatibility or reactivity, to produce structure with irregular refraction indexes. It is generally desirable that the difference in refraction index $|n_1-n_2|$ between two different polymers is $\{|n_1-n_2|>0.001\}$.

It is also absolutely acceptable to appropriately combine three or more different organic materials (monomers, polymers or oligomers), instead of just two types of organic materials, to cause polymerization reaction to progress compositely, thus producing a structure with an irregular refraction index. In other words, from the stand point of the present invention, a combination of three or more different organic materials includes a plurality of combinations of two types of organic materials. Hence, it is needless to say that the number of types of organic materials used for producing structures with irregular refraction indexes has nothing to do with the deviation from the scope of the present invention.

TABLE 1

| Category | Monomer | Polymer No. |
|---|---|---|
| MA | 1. MMA (methyl methacrylate) | 1.49 |
| | 2. EMA (ethyl methacrylate) | 1.483 |
| | 3. nPMA (n-propyl methacrylate) | 1.484 |
| | 4. nBMA (n-butyl methacrylate) | 1.483 |
| | 5. nHMA (n-hexyl methacrylate) | 1.481 |
| | 6. iPMA (isopropyl methacrylate) | 1.473 |
| | 7. iBMA (isobutyl methacrylate) | 1.477 |
| | 8. tBMA (t-butyl methacrylate) | 1.463 |
| | 9. CHMA (cyclohexyl methacrylate) | 1.507 |
| XMA | 10. B$_2$MA (benzyl methacrylate) | 1.568 |
| | 11. PhMA (phenyl methacrylate) | 1.57 |
| | 12. 1-PhEMA (1-phenylethyl methacrylate) | 1.549 |
| | 13. 2-PhEMA (2-phenylethyl methacrylate) | 1.559 |
| | 14. FFMA (furfuryl methacrylate) | 1.538 |
| A | 15. MA (methyl acrylate) | 1.4725 |
| | 16. EA (ethyl acrylate) | 1.4685 |
| | 17. nBA (n-butyl acrylate) | 1.4634 |
| XA | 18. B$_2$MA (benzyl acrylate) | 1.5584 |
| | 19. 2-ClEA (2-chloroethyl acrylate) | 1.52 |

TABLE 2

| Category No. | Monomer | Polymer |
|---|---|---|
| AC | 20. VAc (vinyl acetate) | 1.47 |
| XA | 21. VB (vinyl benzoate) | 1.578 |
| | 22. VPAc (vinyl phenyl acetate) | 1.567 |
| | 23. VClAc (vinyl chloroacetate) | 1.512 |
| C | 24. AN (acrylonitrile) | 1.52 |
| | 25. αMAN (α-methyl acrylonitrile) | 1.52 |
| α-A | 26. MA (2Cl) (methyl-α-chloroacrylate) | 1.5172 |
| St | 27. o-ClSt (o-chlorostyrene) | 1.6098 |
| | 28. p-FSt (p-fluorostyrene) | 1.566 |
| | 29. o, p-FSt (o, p-difluoro styrene) | 1.475 |
| | 30. p-iPSt (p-isopropyl styrene) | 1.554 |

TABLE 3

| | |
|---|---|
| EPM | Copolymer of ethylene and propylene |
| EPDM | 3-component copolymer of ethylene, propylene, and a small amount of non-conjugated diene |

TABLE 3-continued

| | |
|---|---|
| SBR | Copolymer of butadiene and styrene |
| NBR | Copolymer of butadiene and acrylonitrile |
| IIR | Copolymer of a small amount of isoprene and isobutene |
| CR | Polymer of chloroprene |
| BR | Polymer of butadiene |
| IR | Polymer of isoprene |
| Hypalon | Polyethylene reacted with sulfur dioxide and chlorine |
| Urethane rubber | Polymer by polyaddition of diol and di-isocyanate |
| Polysulfide rubber | Polymer by polycondensation with dichloroethane and sodium tetrasulfide, etc. |
| Silicone rubber | Polymer obtained by ring opening polymerization of cyclic siloxane, etc. |
| Fluororubber | Copolymer of vinylidene fluoride and trifluorochloroethylene |

In the present invention, besides those cases in which the materials listed in Table 1 and Table 2 are involved in the polymerization reaction for generating structures with irregular refraction indexes, it is also possible to utilize the polymerization reaction for forming rubber-based polymeric materials. Some of such examples are given in Table 3 in terms of polymers or copolymers. When these rubber-based materials are involved in polymerization reaction, a light scattering light guide having flexibility or elasticity, in particular, can be obtained.

Additionally, unlike the structures with irregular refraction indexes which are obtained by the conventional method in which particles are added, the structures with irregular refraction indexes implemented in the present invention may take, for example, a form in which the phases of high/low refraction indexes are mixed in island or stripe shapes which are random in unit shapes or dimensions, a form in which a certain level of continuity is observed for a refraction index profile in an interfacing area of those two phases, and other similar forms.

Accordingly, it becomes possible to obtain light scattering light guides with various characteristics based on the freedom of the generating forms of structures with irregular refraction indexes in terms of the selection of the material or polymerization reaction. More specifically, the freedom in obtaining desired intensity of scattering powers, scattering angle characteristic, etc. is increased by properly selecting and controlling an effective scattering irradiation parameter E, a correlation distance "a" and a mean square of dielectric constant fluctuation $<\eta^2>$, which will be described below.

The following will quantitatively describe scattering characteristics. Also, brief description, referring to the theory of Debye, will be given about the effective scattering irradiation parameter E, a correlation function $\gamma(r)$, the correlation distance "a" and the mean square of dielectric constant fluctuation $<\eta^2>$, which are useful quantities or functions for selecting and controlling the scattering characteristics of light scattering light guides.

When light having an intensity $I_0$ transmits by y (cm) through a medium, and if the intensity is attenuated to I due to scattering during the transmission, then the effective scattering irradiation parameter E is defined by a following formula (1) or (2):

$$E[cm^{-1}] = -[ln(I/I_0)]/y \quad (1)$$

$$E[cm^{-1}] = -(1/I)dI/dy \quad (2)$$

The formulas (1) and (2) are integral expression and differential expression, respectively, and they physically mean equivalents. Incidentally, the "E" is also called turbidity ($\tau$) occasionally.

In the normal case where the majority of outgoing light is vertically polarized light with respect to vertically polarized incident light ($V_v$ scattering), the intensity of scattered light when light scattering is caused by an irregular structure distributed in a medium, is expressed by the following formula (3):

$$V_v = [(4<\eta^2>\pi^3)/\lambda_0^4] \int C\gamma(r)dr \quad (3)$$

where $$C = [r^2 \sin(vsr)]/vsr \quad (4)$$

When natural light is allowed to let in, it is known that the following formula is applicable where the right side of the formula (3) is multiplied by $(1+\cos\theta^2)$, taking $H_h$ scattering into account to obtain the following formula:

$$I_{vh} = V_v(1+\cos\theta^2) \quad (5)$$

where $\lambda_0$ is the wavelength of the incident light; $v=(2\pi n)/\lambda_0$; $s=2 \sin(\theta/2)$; "n" is the refraction index of the medium; $\theta$ is a scattering angle; $<\eta^2>$ is a mean square of the dielectric constant fluctuation in the medium; and $\gamma(r)$ is a correlation function.

According to Debye, when a structure of the medium with an irregular refraction index is dispersed into phase A and phase B with an interface, the correlation function $\gamma(r)$, the correlation distance "a", the mean square of the dielectric constant fluctuation $<\eta^2>$, etc. with respect to the dielectric constant fluctuation are given by the following relational expression:

$$\gamma(r) = \exp[-r/a] \quad (6)$$

$$a[cm] = (4V/S)\cdot\phi_A\phi_B \quad (7)$$

$$<\eta^2> = \phi_A\phi_B(n_A^2 - n_B^2) \quad (8)$$

where V is a total volume; S a total area of the interface; $\phi_A$ and $\phi_B$, volume proportions of phase A and phase B, respectively; and $n_A$ and $n_B$, the refraction indexes of phase A and phase B, respectively.

When it is regarded that the irregular structure comprises a spherical interface of a radius R, the correlation distance "a" is expressed by the following formula:

$$a[cm] = (4/3)R(1-\phi_A) \quad (9)$$

When the effective scattering irradiation parameter E at the time when natural light is allowed to enter the medium according to the formula (5) is calculated using the formula (6) for the correlation function $\gamma(r)$, the result will be as shown below:

$$E = [(32a^3<\eta^2>\pi^4)/\lambda_0^4]\cdot f(b) \quad (10)$$

where $$f(b) = [\{(b+2)^2/b^2(b+1)\} - \{2(b+2)/b^3\}\cdot\ln(b+1)] \quad (11)$$

$$b = 4v^2a^2 \quad (12)$$

From the relationship described above, it can be seen that it is possible to control the intensity of scattered light, the dependence of the scattered light intensity on angle, and the effective scattering irradiation parameter E by changing the correlation distance "a" and the mean square of the dielectric constant fluctuation $<\eta^2>$.

It is a matter of course that the dependence of the intensity of scattered light on angle may be taken into account when the light scattering light guide according to the present invention is applied to an actual lighting apparatus, etc.

FIG. 15 illustrates curves of the effective scattering irradiation parameter E when E=50 [cm$^{-1}$] and E=100 [cm$^{-1}$], the axis of abscissas indicating the correlation distance "a" and the axis of ordinates indicating the mean square of dielectric constant fluctuation <η$^2$>.

In general, as E increases, the scattering power increases, while the scattering power decreases as E decreases, that is, it becomes almost transparent. E=0 means no scattering.

Accordingly, a small value should be selected for E when applying the light scattering light guide of the present invention to a surface type light source of a large area, a lengthy fiber or rod light source with uniform illumination, etc.

As a yardstick, for example, when E is set to about 0.001 [cm$^{-1}$], it is possible to uniformly light a fiber light scattering light guide measuring up to a few dozen meters. When E is set to about 100 [cm$^{-1}$] as shown in FIG. 1, this setting is suited for illuminating a scope of a few millimeters intensively and uniformly.

Further, when E is set to 50 [cm$^{-1}$] as shown in FIG. 1, this setting is suited for uniformly lighting a light scattering light guide of a medium size (e.g., a few centimeters to a few dozen centimeters).

It is desirable, however, that these values of the effective scattering irradiation parameter E be determined taking into account the specific operating conditions of applied apparatuses, including, for example, the intensity of the primary light source, and the scattering light reinforcing or attenuating factors that depend on optical elements installed nearby.

Values ranging from about 0.005μ to 50μ are considered practical for the correlation distance "a", but it is desirable that the value be determined for each application in consideration of the required angle characteristic or the like.

BEST MODE OF CARRYING OUT THE INVENTION

[EMBODIMENT 1]

0.1 wt % trifluoroethyl methacrylate (3FMA) polymer was dissolved in MMA; 0.2 wt % t-butyl peroxyisopropyl carbonate was added as a radical polymerization initiator; 0.2 wt % n-butyl mercaptan was added as a chain transfer agent; and the mixture was polymerized at 70° C. for 96 hours, and then subjected to heat treatment to obtain light scattering light guides in several different shapes including rod shape and plate shape. The effective scattering irradiation parameter E could be changed gradually in a plane surface by gradually and the thickness of the plate-shaped body and the composition of the 3FMA polymer.

Figure 1:
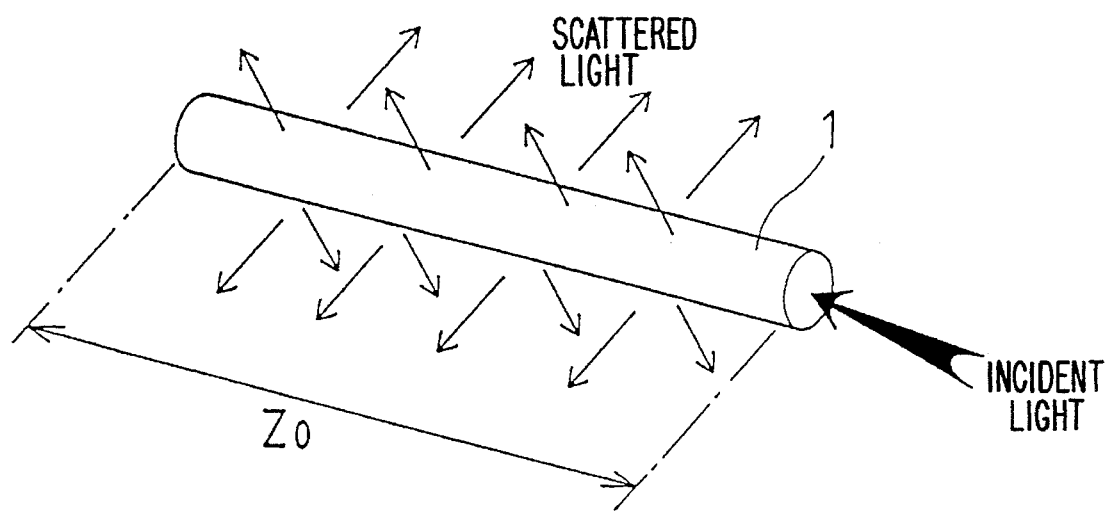
FIG. 1 is a perspective view of a rod-shaped light scattering light guide.

When light was let in a rod-shaped light scattering light guide 1 (see FIG. 1) from an axial direction, the $V_v$ scattering intensity at a scattering angle 90° was 2×10$^{-4}$ to 1.5×10$^{-3}$ [cm$^{-1}$], and the $H_v$ scattering intensity was 5×10$^{-5}$ to 1.1×10$^{-2}$ [cm$^{-1}$].

Figure 2:
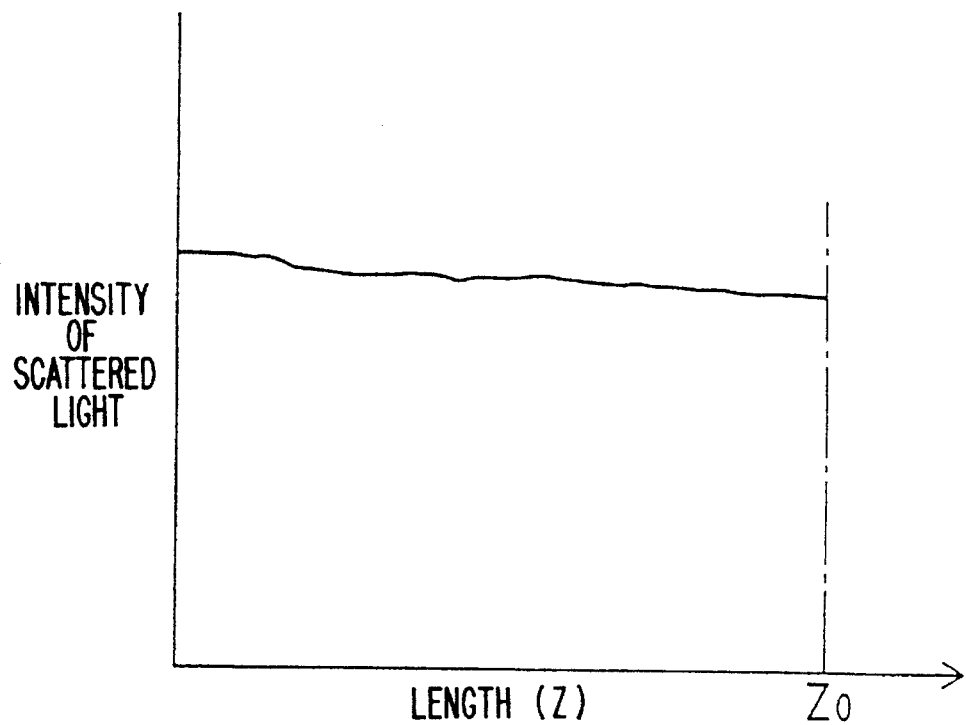
FIG. 2 shows an example of the rod-shaped light scattering light guide shown in FIG. 1, in which the intensity of scattered light is distributed lengthwise.

The intensity of lengthwise scattering changes as shown in FIG. 2, presenting a relatively flat characteristic.

Figure 3:
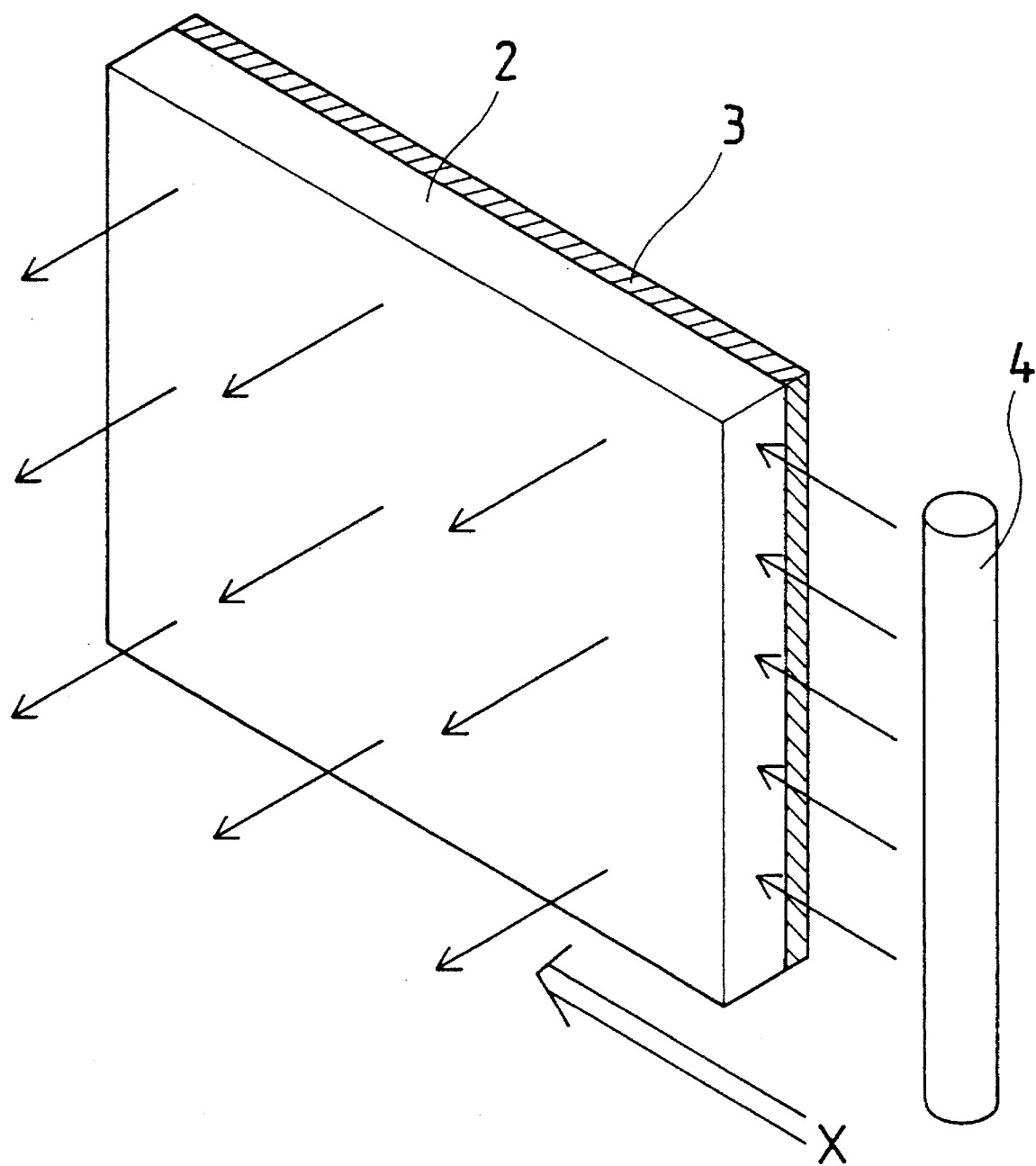
FIG. 3 is a perspective view of a rod-shaped light scattering guide.

Further, as shown in FIG. 3, in the case of a plate-shaped light scattering light guide 2, a mirror 3 was installed on the back, and uniform light from a light source 4 was let in vertically to measure the intensity of the scattered light.

The intensity of the scattered light was measured by scanning the front surface of the light scattering light guide 2 with a silicon photocell.

Uniform distribution of scattered light intensity throughout the front surface area was successfully implemented by changing the concentration of the 3FMA in direction "x" to give a gradient to the effective scattering irradiation parameter E.

Similarly, uniform distribution of the intensity of the scattered light could also be implemented successfully by changing the thickness in direction "x".

In the example shown in FIG. 3, a mirror was placed behind the light scattering light guide; however, it was found that a surface-type light source having uniform illuminance distribution can be obtained without using a reflection reinforcing means such as a mirror or a reflector with a granular reflecting element distributed therein or the like if light is let into the plate-shaped light scattering light guide of an appropriate size (e.g., a few centimeters to several tens of centimeters) from both sides. When this type of configuration is applied to the backlight source or the like of a liquid crystal display device, it will be extremely effective for reducing the size of the device. In addition, if the back is optically opened, then the device will be useful as a double-sided light source.

[EMBODIMENT 2]

MMA and vinyl benzoate (VB) were copolymerized at a ratio of 4 to 1. The polymerization was performed at 130° C. for 96 hours using 0.2 wt % di-tertiary butyl peroxide (DBPO) as the polymerization initiator and 0.2wt % n-butyl mercaptan as the chain transfer agent.

The obtained light scattering light guide was measured under the same condition as that in embodiment 1; it was proved that the light scattering light guide had almost the identical characteristics as the light scattering light guide obtained in embodiment 1.

[EMBODIMENT 3]

For preparation, 0.15 wt % 3FMA polymer was dissolved in MMA, and 0.1 wt % 3FMA polymer was dissolved in MMA; then 0.2 wt % t-butyl peroxyisopropyl carbonate as a radical polymerization initiator and 0.2 wt % n-butyl mercaptan as the chain transfer agent were added for polymerization that was made to take place at 70° C. for 72 hours; then heat treatment was applied at 130° C. for 24 hours to produce rod-shaped (20 mm diameter) light scattering light guides.

Figure 4:
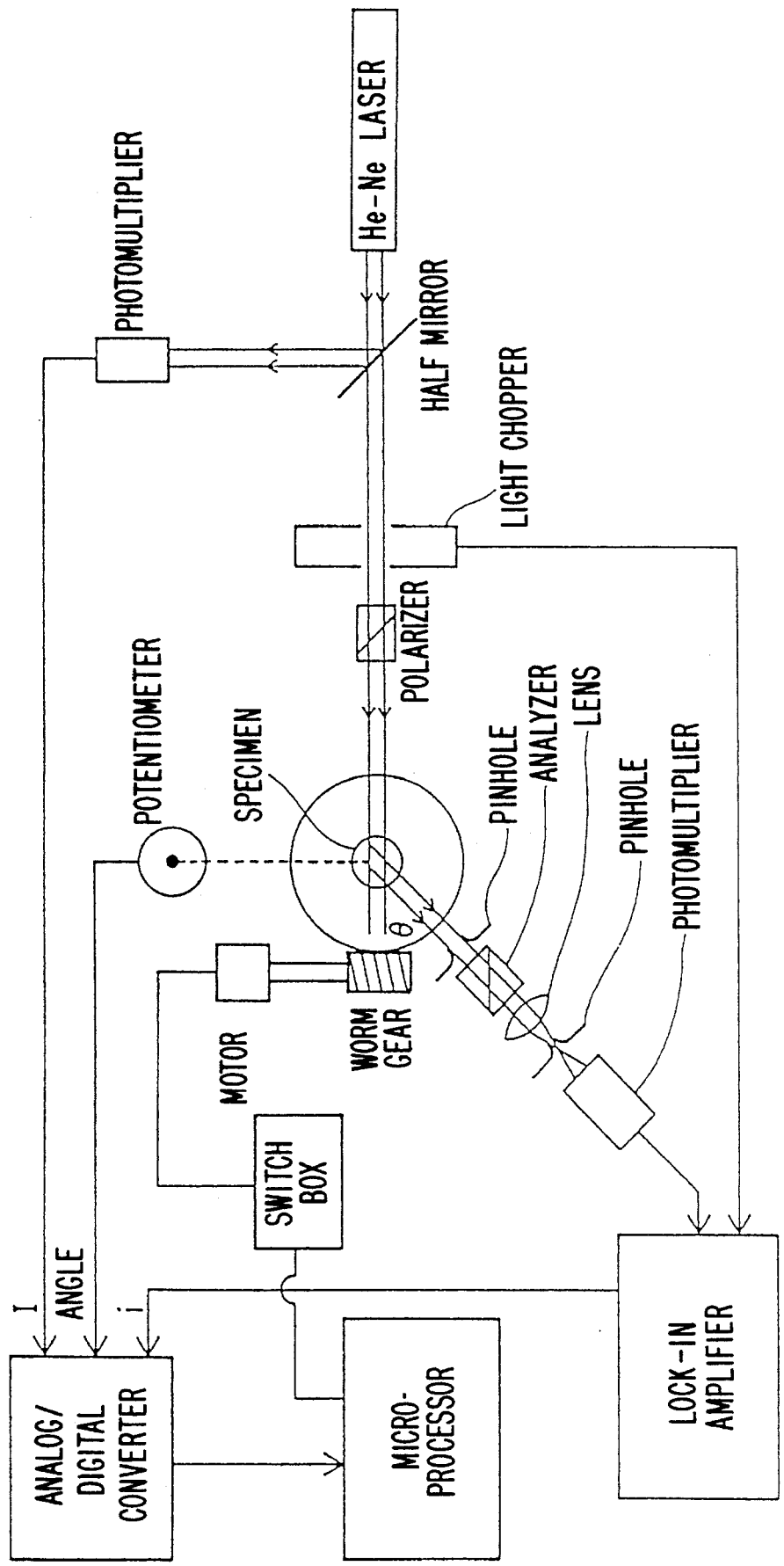
FIG. 4 is a schematic view showing an example of a measuring apparatus for the intensity of scattered light.
Figure 5A:
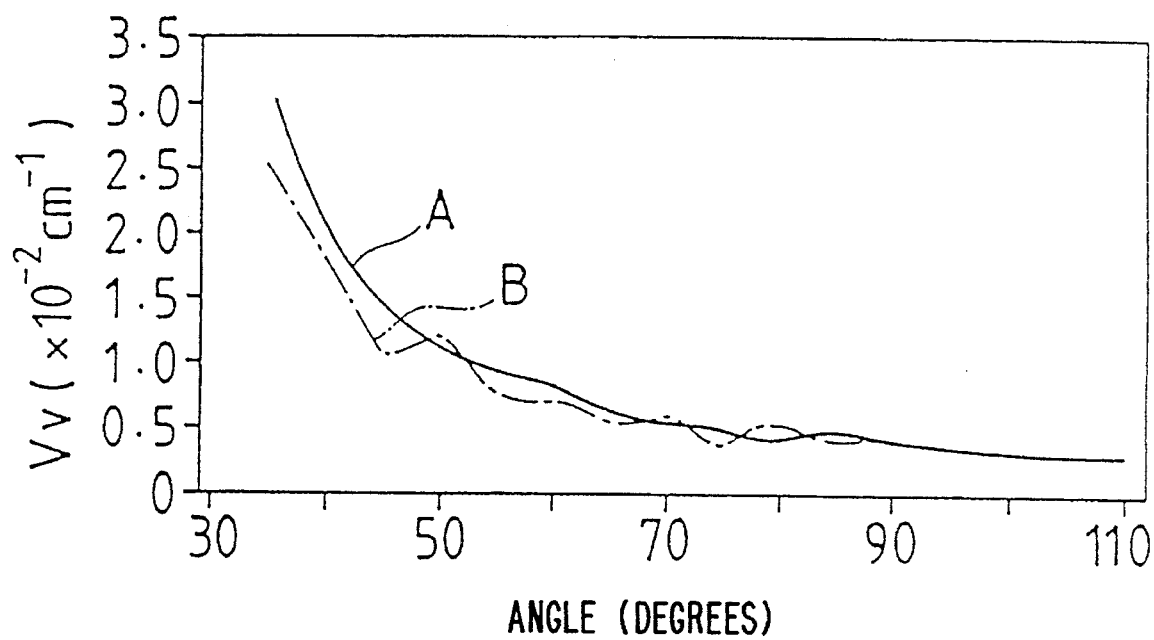
FIG. 5(a) and (b) show an example of the dependency-on-angle of scattered light intensity of $V_v$ scattering and $H_v$ scattering.
Figure 5B:
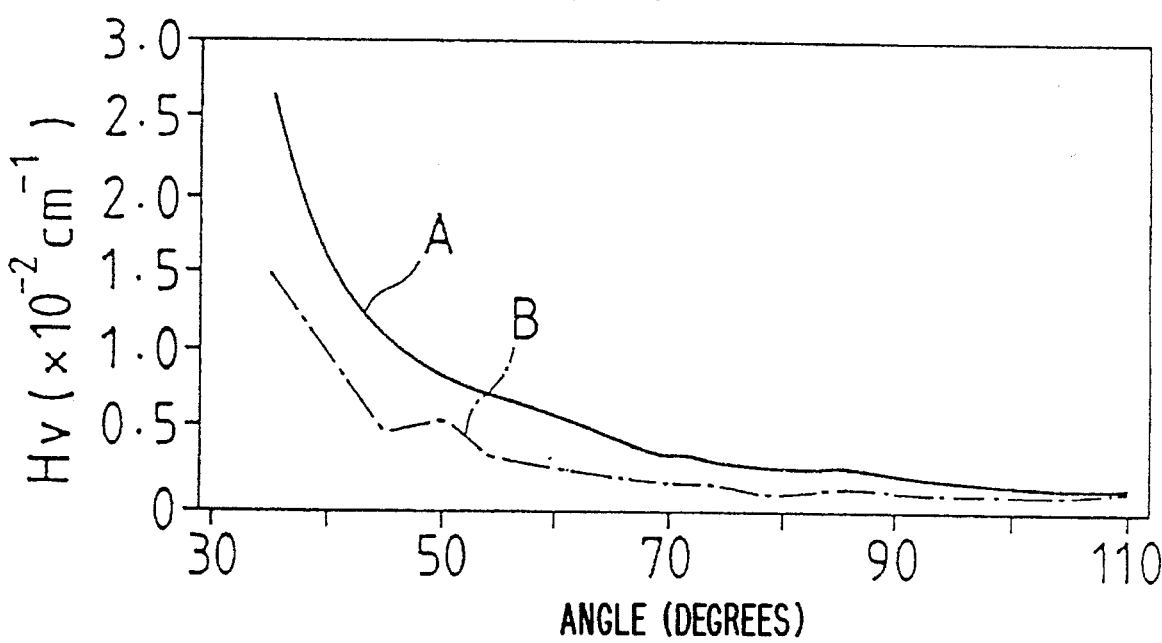

The light scattering light guide was set as specimen at the center of the goniometer of the measuring apparatus shown in FIG. 4, and a He-Ne laser beam, which was vertically polarized (V polarization), was let in through the side surface; then the intensity of the scattered light in a direction having an angle $\theta$ with respect to the incident direction was measured. The results of measurement of the vertically polarized wave component $V_v$ and the horizontally polarized wave component $H_v$ of the scattered light are shown in FIG. 5(a) and (b). In the figures, A represents the case wherein the concentration of the 3FMA polymer is 0.15 wt %, and B represents the case wherein the concentration is 0.1 wt %.

The vertically polarized wave component $V_v$ corresponds to isotropic scattering, while the horizontally polarized wave component $H_v$ corresponds to anisotropic scattering.

In this light scattering light guide, no significant difference is observed between the vertically polarized wave component $V_v$ and the horizontally polarized wave component $H_v$. This means that the scattered light scarcely has polarizing property regardless of the polarized direction of incident light. Hence, such a light scattering light guide can be used as an optical element for erasing polarizing property (a kind of scrambler).

Further, the correlation distance was calculated using the aforesaid relational expression Debye and the dependency-on-angle of the vertically polarized wave component (the intensity of the $V_v$ scattered light), and it was found that the intensity of the $V_v$ scattered light is dependent on angle, due to a structure with an irregular refraction index measuring approximately 1000 angstroms.

[EMBODIMENT 4]

MMA and vinyl benzoate (VB) were copolymerized at a ratio of 4 to 1. The polymerization was performed at 70° C. for 96 hours, using 0.2 wt % di-tertiary butyl peroxide (DBPO) as the polymerization initiator and 0.2 wt % n-butyl mercaptan as the chain transfer agent.

For the obtained light scattering light guide, the correlation distance "a" and the mean square of dielectric constant fluctuation $<\eta^2>$ were calculated using Debye's relational expression. As a result, the following values were obtained: correlation distance "a"=720 angstroms; mean square of dielectric constant fluctuation $<\eta^2>=1.22\times10^{-6}$.

[EMBODIMENT 5]

0.2 wt % polystyrene polymer having a molecular weight of 47500 was dissolved in MMA, to which 0.2 wt % t-butyl peroxyisopropyl carbonate as the radical polymerization initiator and 0.2 wt % n-butyl mercaptan as the chain transfer agent were added, and the polymerization was made to take place at 70° C. for 96 hours to produce a rod-shaped light scattering light guide (5 mm in diameter).

Figure 6:
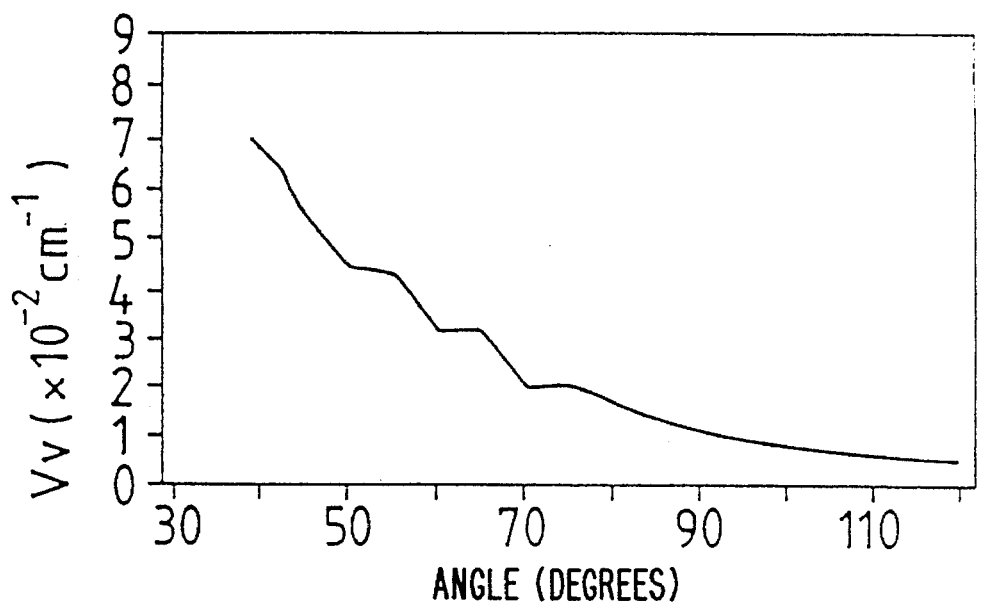
FIG. 6 shows another example illustrating the dependence of the scattered light intensity of the $V_v$ scattering on angle.

The dependency-on-angle of the isotropic light scattering ($V_v$) of the light scattering light guide is shown in FIG. 6.

Figure 7:
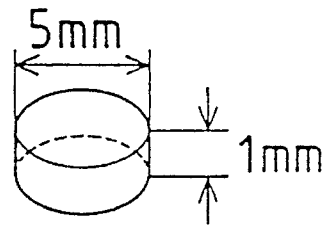
FIG. 7 shows a disc-shaped light scattering light guide.
Figure 8:
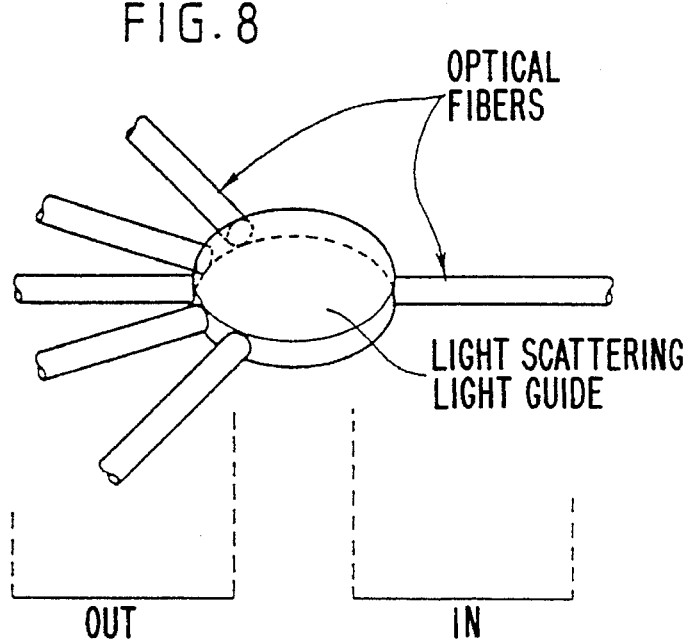
FIG. 8 shows the layout of a light branching/mixing apparatus for checking the light scattering characteristics of the disc-shaped light scattering light guide shown in FIG. 7.

Further, the light scattering light guide was formed into the disc shape as shown in FIG. 7, then it was interposed between reflecting plates, one on its top and the other on its bottom, and optical fibers were connected to the incoming and outgoing sides as shown in FIG. 8. One optical fiber was connected to the incoming side, while five optical fibers were connected to the outgoing side to configure an optical branching apparatus (or an optical mixing apparatus). When an optical signal enters through the incoming side, optical signal outputs of nearly equivalent intensities were obtained on the five optical fibers on the outgoing side.

[EMBODIMENT 6]

0.1 wt % 3FMA polymer was dissolved in MMA, to which 0.2 wt % t-butyl peroxyisopropyl carbonate as the radical polymerization initiator and 0.2 wt % n-butyl mercaptan as the chain transfer agent were added; the polymerization was made to take place at 70° C. for 72 hours; and then heat treatment was applied at 130° C. for 24 hours to produce a rod-shaped light scattering light guide (10 mm in diameter).

This light scattering light guide was heated at about 200° C. for softening so that it can be drawn into a fiber- or thread-shaped light scattering light guide having a 1 mm outside diameter. When a He-Ne laser beam was let into this light scattering light guide, it was confirmed that the guide radiates uniform scattered light while transmitting light for approximately 1 meter.

The refraction index of the drawn fiber-shaped light scattering light guide was 1.491; however, using a copolymer of MMA and benzyl methacrylate, which has a different refraction index, 1.502, and providing it with a cover, an optical fiber device consisting of the light scattering light guide could be produced.

When a He-Ne laser beam was let into this optical fiber, it was confirmed that the optical fiber radiated uniform scattered light while transmitting light for about 80 cm.

Furthermore, when a copolymer comprising an MMA having a refraction index of 1.480 and 3FMA was used as the covering material, the length of the uniform scattered light guiding distance increased to approximately 2 meters.

[EMBODIMENT 7]

0.1 wt % 3FMA polymer was dissolved in MMA, to which 0.2 wt % t-butyl peroxyisopropyl carbonate as the radical polymerization initiator and 0.2 wt % n-butyl mercaptan as the chain transfer agent were added; the polymerization was made to take place at 70° C. for 72 hours; and then heat treatment was applied at 130° C. for 24 hours to produce a rod-shaped light scattering light guide (10 mm in diameter).

This light scattering light guide was pelleted and pulverized, and then divided into a cone-shaped molding container measuring 10 mm in the bottom surface diameter and 30 mm in height, and a spherical molding container measuring 6 mm in diameter. They were then heated at about 200° C. to produce light scattering light guides having the shapes corresponding to the shapes of their respective containers.

This proved that it is possible to produce light scattering light guides having any shapes and sizes by selecting containers which have such shapes and sizes.

[EMBODIMENT 8]

The 3FMA polymer was dissolved in MMA in four different weight percentages, 0.40 wt %, 0.30 wt %, 0.05 wt %, and 0.01 wt %, for preparation (which will be represented by characters W1, W2, W3 and W4 in that order, including the resultant light scattering light guides); 0.2 wt % t-butyl peroxyisopropyl carbonate as the radical polymerization initiator and 0.2 wt % n-butyl mercaptan as the chain transfer agent were added; polymerization was made to take place at 70° C. for 72 hours; and then heat treatment was applied at 130° C. for 24 hours to produce four different wedge-shaped light scattering light guides. Each element measured 80 mm vertically, 100 mm horizontally, and 4 mm at the thickest section.

Figure 9:
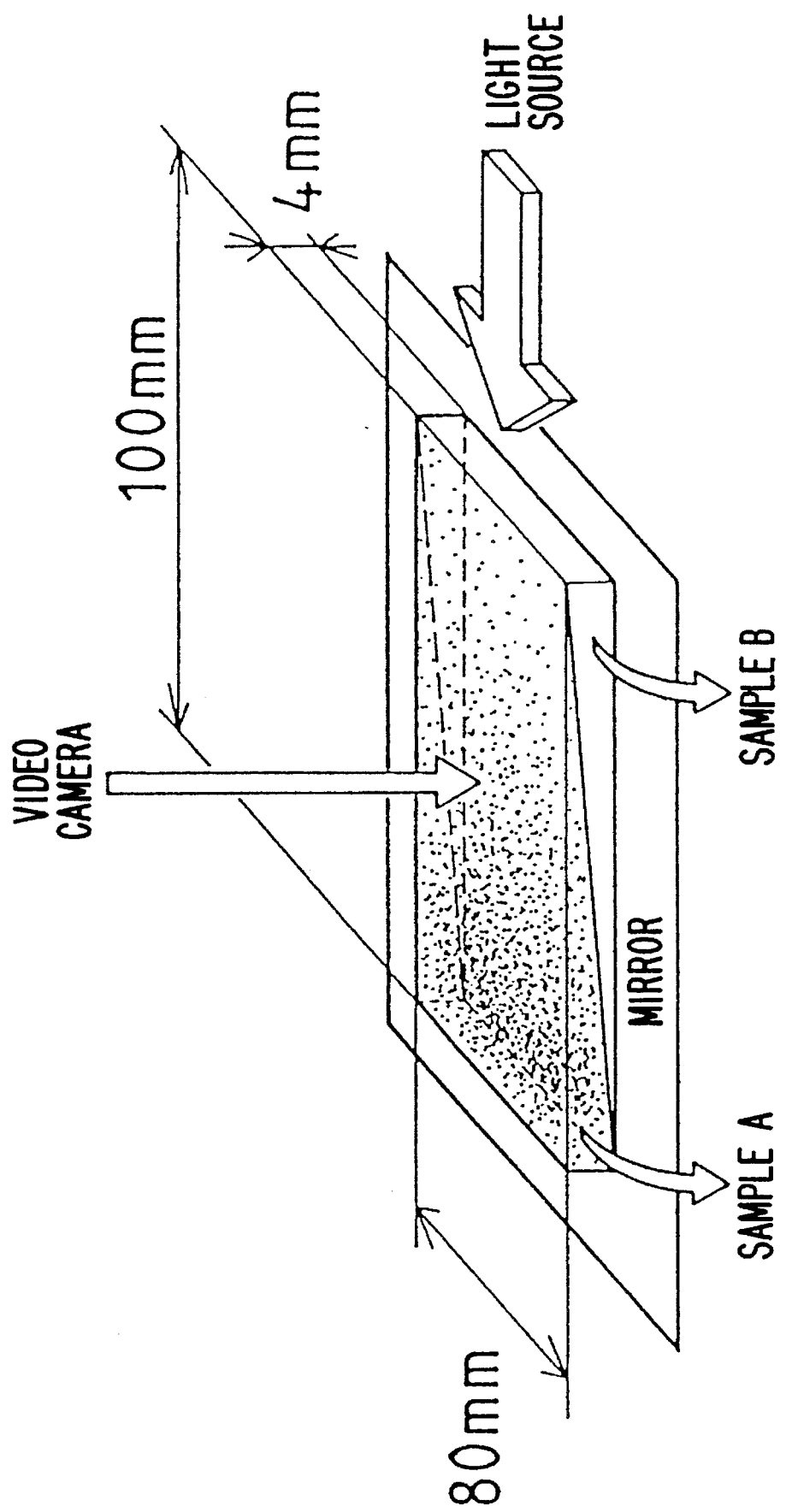
FIG. 9 shows a glued condition of a wedge type light scattering light guide and a testing method.

Among these light scattering light guide elements, two (samples A and B) were optionally combined to produce a plate-shaped light scattering light guide as shown in FIG. 9, and the light of a fluorescent light was let in through its side.

Then a video camera was placed on one side, and the intensity of the scattered light was measured by using an intensity display.

The results of measurement of various combinations of samples A and B are shown in FIG. 10 through FIG. 13.

I (x) represents the intensity of the scattered light in the horizontal direction, while I (y) represents that in the vertical direction, the central black and white shade corresponding to the light illuminance.

Figure 10:
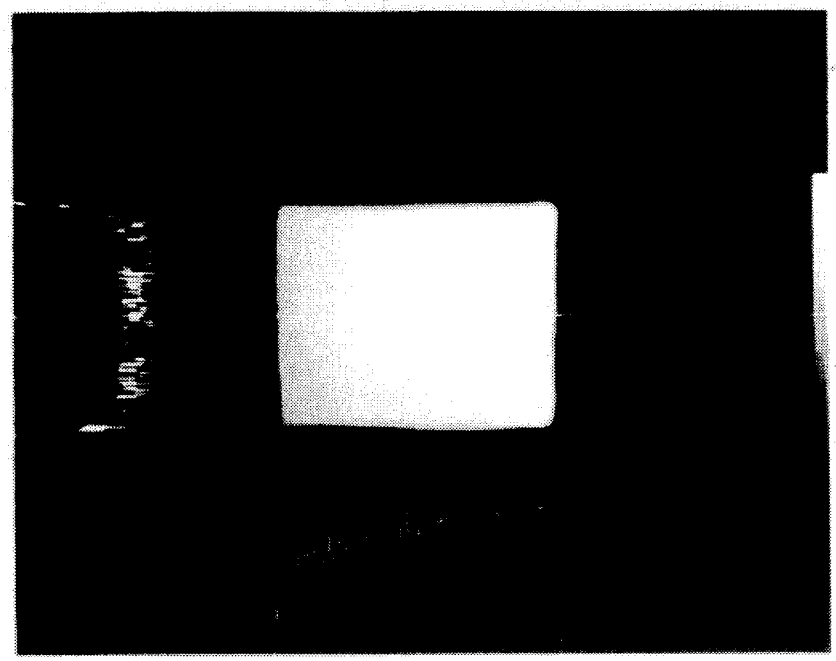
FIG. 10, FIG. 11, FIG. 12, and FIG. 13 show the states of surface illumination and the distribution of light intensity when a surface-type light source is configured using a plate-shape light scattering light guide of the present invention.
Figure 11:
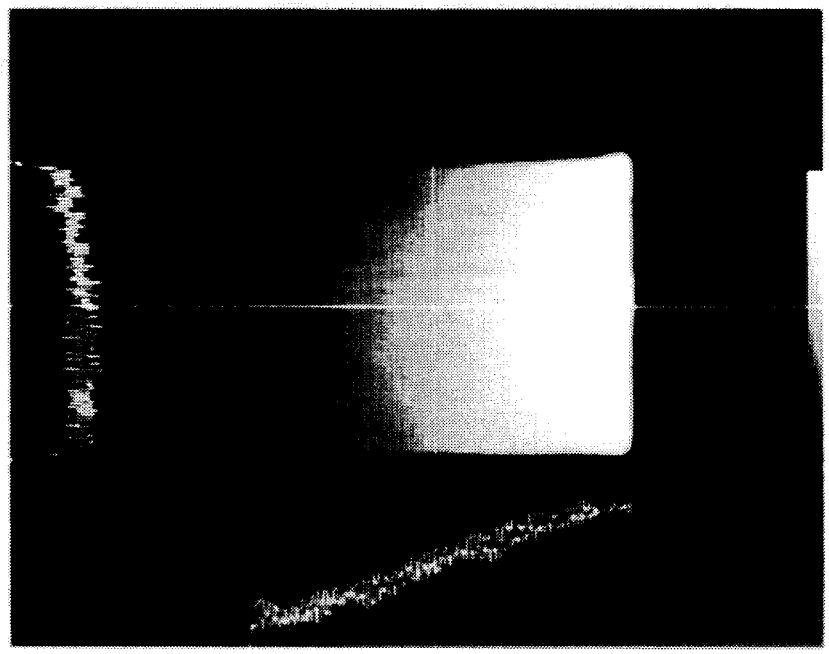
Figure 12:
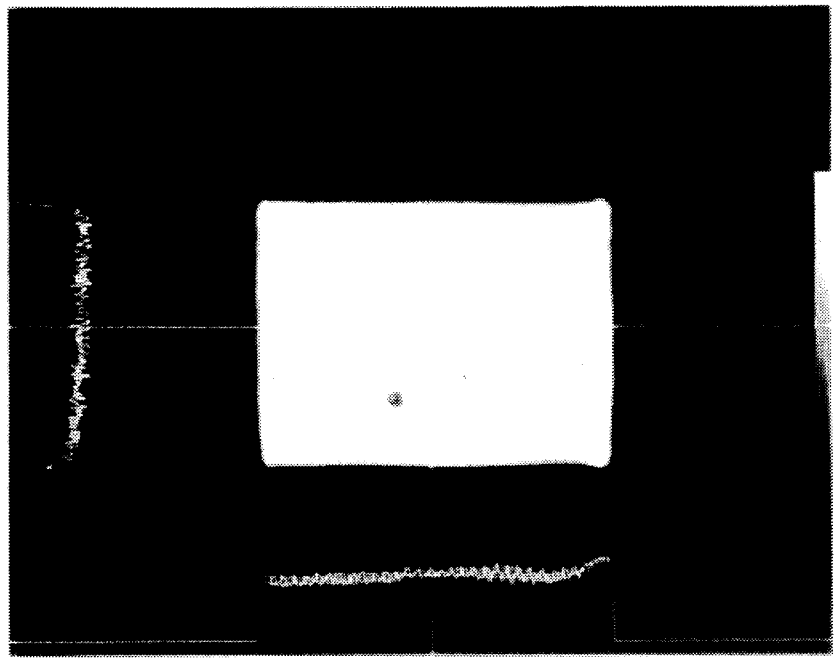

FIG. 10 shows W2 chosen as sample A and W3 chosen as sample B (A=W2, B=W3). FIG. 11 shows a combination of A=W1 and B=W3; FIG. 12 a combination of A=W2 and B=W4, and FIG. 13 a combination of A=W1 and B=W4.

Figure 13:
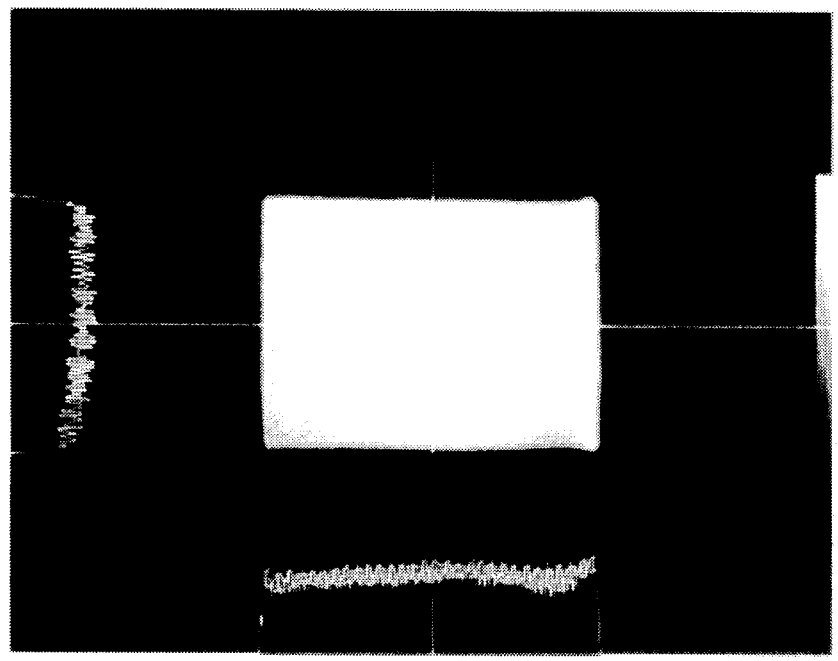

In the cases shown in FIG. 10 and FIG. 11, a relatively large gradients are observed in the intensity of the scattered light, while the cases shown in FIG. 12 and FIG. 13 clearly indicate that extremely flat distribution of the scattered light intensities have been implemented.

It is obvious that the light scattering light guides providing uniform scattered light as is illustrated in FIG. 12 or FIG. 13 is highly valuable as the backlight source for a liquid crystal display device.

[EMBODIMENT 9]

0.1 wt % 3FMA polymer was dissolved in MMA, to which 0.2 wt % t-butyl peroxyisopropyl carbonate as the radical polymerization initiator and 0.2 wt % n-butyl mercaptan as the chain transfer agent were added; polymerization was made to take place at 70° C. for 72 hours; and then heat treatment was applied at 130° C. for 24 hours to produce a wedge-shaped light scattering light guide.

Figure 14A:
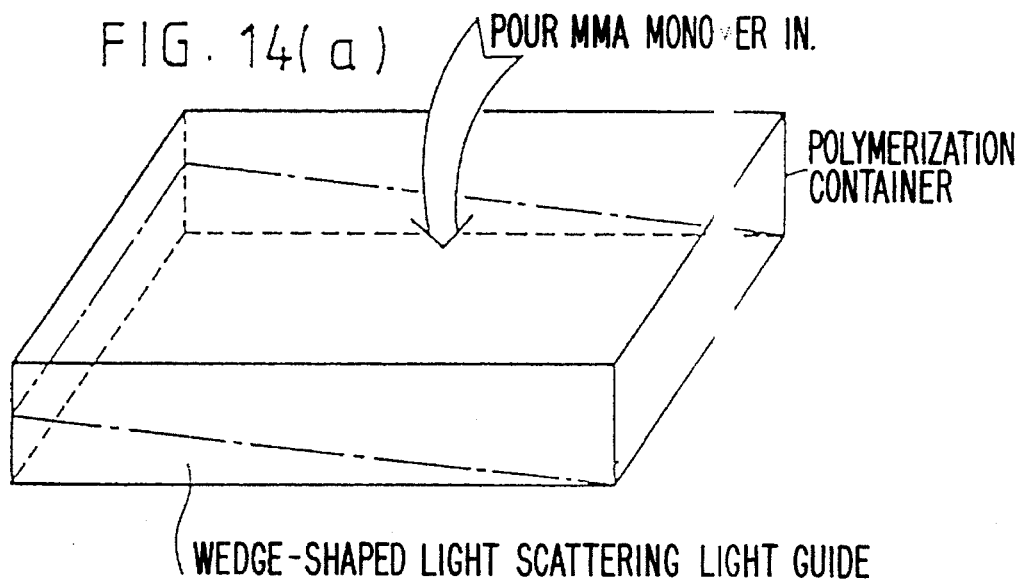
FIG. 14(a) and (b) show the manufacturing method of the wedge type light scattering light guide.

This was placed, as shown in FIG. 14(a), in a polymerization reaction container, and a monomer containing a polymerization initiator was poured in to cause diffused polymerization at 60° C.

Figure 14B:
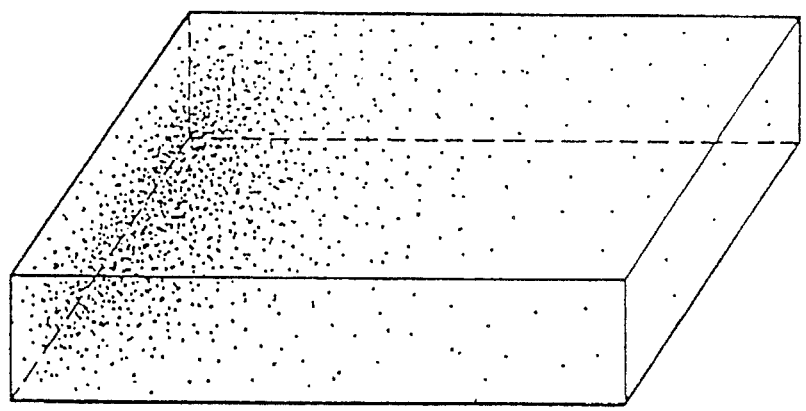
Figure 15:
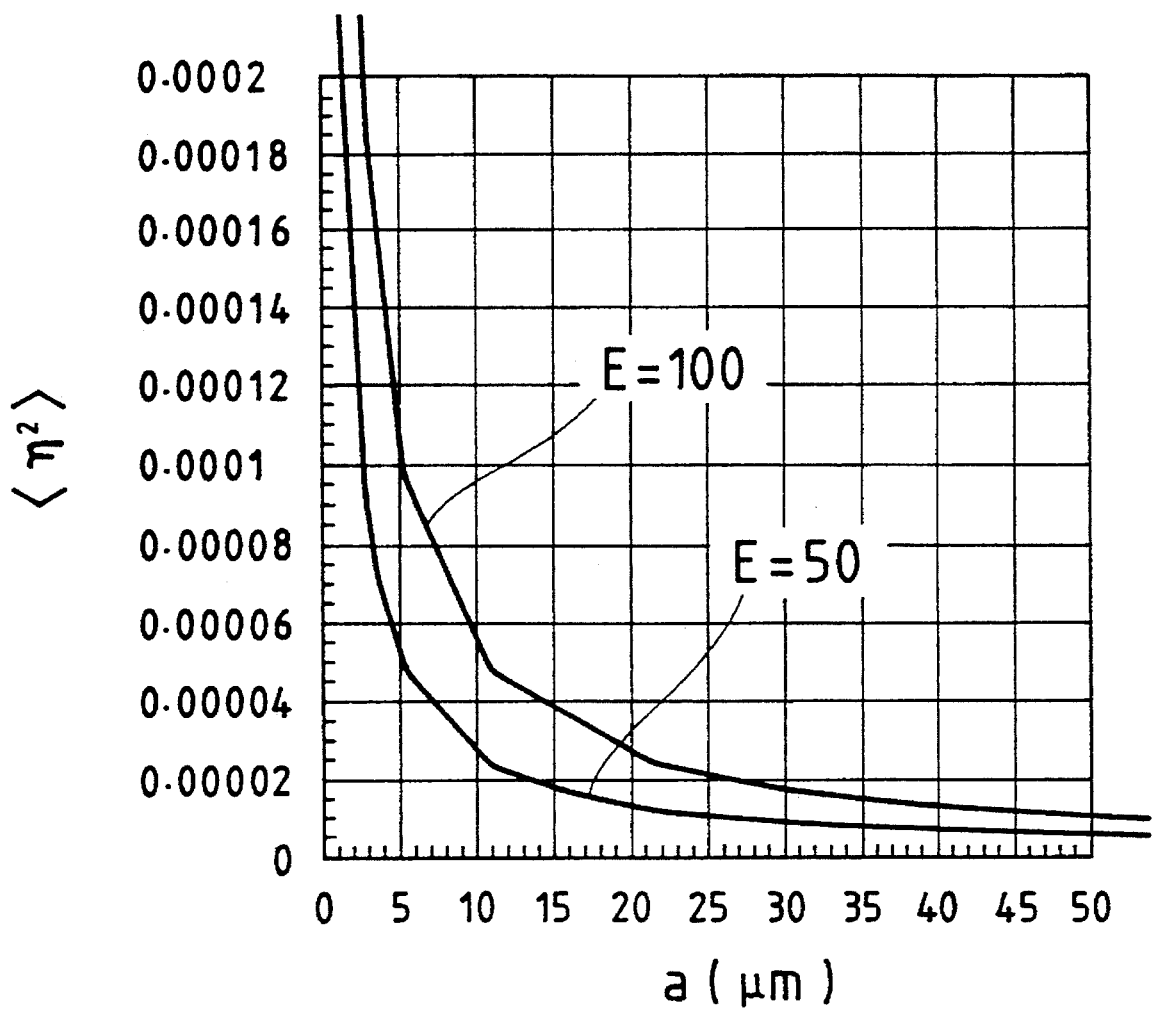
FIG. 15 shows curves of the effective scattering irradiation parameter E when E=50 [cm$^{-1}$] and E=100 [cm$^{-1}$], the axis of abscissa representing the correlation distance "a", and the axis of ordinate representing the mean square of dielectric constant fluctuation <η$^2$>.

As a result, a plate-shaped light scattering light guide as shown in FIG. 14(b) was obtained. This plate-shaped light scattering light guide exhibits a constant effective scattering irradiation parameter in the direction of its thickness while its effective scattering irradiation parameter E is provided with a gradient in the X-axis direction as shown in the figure. The light scattering light guide having a scattering power which changes only in a specific direction like this has been obtained, due to the reason that in polymerizing the wedge-shaped light scattering guide prepared in advance, swell occurred toward the MMA monomer, and the composition was made uniform vertically to a certain extent.

When the effective scattering irradiation parameter E was calculated from the scattered light intensity, it was found that the values of E varied from 2.30 [cm$^{-1}$] to $5\times10^{-3}$ [cm$^{-1}$] along the X-axis.

Further, it was found possible to produce light scattering light guides of various shapes (e.g., spherical, corrugated, etc.) other than the wedge shape according to the methods described above, and it is also possible to make a plate-shaped or rectangular parallelepiped light scattering light guide having the distribution of a desired scattering power (effective scattering irradiation parameter E) in a desired direction.

[EMBODIMENT 10]

0.2 wt % t-butyl peroxyisopropyl carbonate as the radical polymerization initiator and 0.2 wt % n-butyl mercaptan as the chain transfer agent were added to MMA; polymerization reaction was made to take place at 60° C. (below the glass transition temperature) for 240 hours. The remaining monomer is trapped in the PMMA matrix which solidifies in a stage where a high conversion ratio is accomplished, but this monomer can be polymerized by the extended heating. In this case, the volumetric change (contraction), which takes place when the monomer turns into a polymer, causes numerous microvoids to be formed, the micro-voids functioning as a structure with an irregular refraction index to cause light scattering.

The dependency-on-angle of the $V_v$ scattering intensity of the light scattering light guide sample obtained by the process described above was measured, and the correlation distance "a" was calculated according to the relational expression of Debye. The calculation result was 850 angstroms.

Furthermore, the value of the mean square of dielectric constant fluctuation $<\eta^2>$ was $11\times10^{-7}$, and the effective scattering irradiation parameter E was 0.17 [cm$^{-1}$].

The measured values of the $V_v$ scattering intensity were $3\times10^{-4}$ at $\theta=40°$ and $0.8\times10^{-4}$ at $\theta=90°$. Further, when $\theta$ was set to 100°, the value decreased to $0.5\times10^{-4}$ (one sixth of the value obtained when $\theta=40°$).

In other words, the light scattering light guide, which has the structure with an irregular refraction index (micro-voids) obtained in the process of this embodiment, showed a tendency to develop more forward scattering than backward scattering.

[EMBODIMENT 11]

0.2 wt % 3FMA polymer was dissolved in MMA, to which 0.2 wt % t-butyl peroxyisopropyl carbonate as the radical polymerization initiator and 0.2 wt % n-butyl mercaptan as the chain transfer agent were added; polymerization was made to take place at 70° C. for 72 hours; and then heat treatment was applied at 130° C. for 24 hours to produce a plate-shaped light scattering light guide (10 cm×10 cm; uniformly 5 mm in thickness).

The light of a fluorescent lamp was let into this light scattering light guide through both sides in the arrangement according to FIG. 3. The intensity of the scattered light was measured with a reflecting film (not necessarily has to be a mirror surface) placed behind the light scattering light guide and a prism type light diffusion plate installed at the front (A backlight scattering reinforcing device with scattering elements distributed in dot patterns, which is normally used, is not used for this purpose).

It was found that, with the fluorescent lamp of a regular luminous intensity used as the light source, the light was emitted at a brightness of about 4400 candelas over the whole front surface of the light scattering light guide.

Under the same condition, light intensity of a commercially available conventional light scattering light guide for backlight was measured to find the measured value to be approximately 3400 candelas.

This result of measurement indicates that the illuminance has been improved by about 23% over the conventional light scattering light guide.

Furthermore, 0.5 wt % BzMA polymer was dissolved in MMA and polymerized under the same condition to make a light scattering light guide of the same shape and size. Then, the same measurement was performed using this light scattering light guide; the obtained measurement results showed almost no difference.

INDUSTRIAL APPLICABILITY

According to the light scattering light guide of the present invention, it is possible to convert a light flux of a relatively small area into a light flux of a relatively large area with high efficiency and uniformity by utilizing a process of forming a structure with an irregular refraction index by polymerization reaction of organic materials, which process features an extremely high level of freedom (a wide choice of materials, the value of the effective scattering irradiation parameter E, the value of correlation distance "a", the shape of the light scattering guide, etc.), thus providing high industrial utility in any fields of optical industry requiring scattered light with a high level of uniformity.

More particularly, possible applications includes apparatuses for intensive and high-powered illumination of a narrow scope such as the backlight source apparatuses for various types of displays including liquid crystal display devices, the backlight light sources in automobiles or the like, the light sources with a variety of shapes and sizes for various types of lighting systems, which utilize sunlight or ordinary lighting sources as the primary light sources, the light flux expanding apparatuses using light sources such as a laser and light emitting diode as the primary light sources, the light branching/mixing apparatus in an optical signal transmission system, a microscope, etc.

I claim:

1. A light guide comprising:

a light source; and a polymer material in visual communication with the light source, the polymer material comprising:

a first polymer; and aggregated chains of a second polymer uniformly disbursed within the first polymer so that the correlation distance "a" lies in the range of 0.07 $\mu m \leq a \leq 50$ $\mu m$ and the effective scattering irradiation parameter E lies in the range of 0.45 $cm^{-1} \leq E \leq 80$ $cm^{-1}$.

2. A light guide according to claim 1, wherein the effective scattering irradiation parameter E is in the range of 0.45 $cm^{-1} \leq E \leq 50$ $cm^{-1}$.

3. A light guide according to claim 1, wherein the effective scattering irradiation parameter E is in the range of 0.45 $cm^{-1} \leq E \leq 2.30$ $cm^{-1}$.

4. A light scattering light guide comprising a polymer material produced by the process comprising the steps of:

(a) providing first and second organic substances, the first organic substance being a monomer and the second organic substance being a polymer, a polymer of the fast organic substance having a different refractive index and a different compatibility than those of the second organic substance;

(b) preparing a mixture by substantially completely dissolving the second organic substance in the first organic substance; and (c) allowing the first organic substance in the mixture to polymerize so that as polymerization proceeds, compatibility with the second organic substance decreases causing the second organic substance to coagulate, the polymer material having a correlation distance "a" in the range of 0.07 $\mu m \leq a \leq 50$ $\mu m$ and an effective scattering irradiation parameter E in the range of 0.45 $cm^{-1} \leq E \leq 80$ $cm^{-1}$.

5. A light guide according to claim 4, wherein the effective scattering irradiation parameter E is in the range of 0.45 $cm^{-1} \leq E \leq 50$ $cm^{-1}$.

6. A light guide according to claim 4, wherein the effective scattering irradiation parameter E is in the range of 0.45 $cm^{-1} \leq E \leq 2.30$ $cm^{-1}$.

7. A light scattering light guide comprising a polymer material produced by the process comprising the steps of:

(a) preparing a monomer mixture by combining first and second monomers, the first monomer being more reactive than the second monomer, the respective polymers of the first and second monomers having different refractive indices; and (b) allowing the monomer mixture to polymerize so that initially the first monomer polymerizes preferentially causing the second monomer to coagulate, and subsequently, as the first monomer is consumed, the second monomer polymerizes preferentially, the polymer material having a correlation distance "a" in the range of 0.07 $\mu m \leq a \leq 50$ $\mu m$ and an effective scattering irradiation parameter E in the range of 0.45 $cm^{-1} \leq E \leq 80$ $cm^{-1}$.

8. A light guide according to claim 7, wherein the effective scattering irradiation parameter E is in the range of 0.45 $cm^{-1} \leq E \leq 50$ $cm^{-1}$.

9. A light scattering light guide comprising a plate-shaped polymer material produced by the process comprising the steps of:

(a) providing first and second organic substances, the first organic substance being a monomer and the second organic substance being a polymer, a polymer of the first organic substance having a different refractive index and a different compatibility than those of the second organic substance;

(b) preparing a mixture by substantially completely dissolving the second organic substance in the first organic substance; and (c) allowing the first organic substance in the mixture to polymerize so that as polymerization proceeds, compatibility with the second organic substance decreases causing the second organic substance to coagulate, the plate-shaped polymer material having a correlation distance "a" in the range of 0.07 $\mu m \leq a \leq 50$ $\mu m$ and an effective scattering irradiation parameter E in the range of $0.45 \text{ cm}^{-1} \leq E \leq 80 \text{ cm}^{-1}$.

10. A light guide according to claim 9, wherein the effective scattering irradiation parameter E is in the range of $0.45 \text{ cm}^{-1} \leq E \leq 50 \text{ cm}^{-1}$.

11. A light guide according to claim 9, wherein the effective scattering irradiation parameter E is in the range of $0.45 \text{ cm}^{-1} \leq E \leq 2.30 \text{ cm}^{-1}$.

12. A light scattering light guide comprising a plate-shaped polymer material produced by the process comprising the steps of:

(a) preparing a monomer mixture by combining first and second monomers, the first monomer being more reactive than the second monomer, the respective polymers of the first and second monomers having different refractive indices; and (b) allowing the monomer mixture to polymerize so that initially the first monomer polymerizes preferentially causing the second monomer to coagulate, and subsequently, as the first monomer is consumed, the second monomer polymerizes preferentially, the plate-shaped polymer material having a correlation distance "a" in the range of $0.07 \text{ μm} \leq a \leq 50 \text{ μm}$ and an effective scattering irradiation parameter E in the range of $0.45 \text{ cm}^{-1} \leq E \leq 80 \text{ cm}^{-1}$.

13. A light guide according to claim 12, wherein the effective scattering irradiation parameter E is in the range of $0.45 \text{ cm}^{-1} \leq E \leq 50 \text{ cm}^{-1}$.

14. A light scattering light guide comprising a curved, plate-shaped, rod-shaped, linear, cone-shaped or spherical polymer material produced by the process comprising the steps of:

(a) providing first and second organic substances, the first organic substance being a monomer and the second organic substance being a polymer, a polymer of the first organic substance having a different refractive index and a different compatibility than those of the second organic substance;

(b) preparing a mixture by substantially completely dissolving the second organic substance in the first organic substance; and (c) allowing the first organic substance in the mixture to polymerize so that as polymerization proceeds, compatibility with the second organic substance decreases causing the second organic substance to coagulate, the curved, plate-shaped, rod-shaped, cone-shaped or spherical polymer material having a correlation distance "a" in the range of $0.07 \text{ μm} \leq a \leq 50 \text{ μm}$ and an effective scattering irradiation parameter E in the range of $0.45 \text{ cm}^{-1} \leq E \leq 80 \text{ cm}^{-1}$.

15. A light guide according to claim 14, wherein the effective scattering irradiation parameter E is in the range of $0.45 \text{ cm}^{-1} \leq E \leq 50 \text{ cm}^{-1}$.

16. A light guide according to claim 14, wherein the effective scattering irradiation parameter B is in the range of $0.45 \text{ cm}^{-1} \leq E \leq 2.30 \text{ cm}^{-1}$.

17. A light scattering light guide comprising a curved, plate-shaped, rod-shaped, cone-shaped or spherical polymer material produced by the process comprising the steps of:

(a) preparing a monomer mixture by combining first and second monomers, the first monomer being more reactive than the second monomer, the respective polymers of the first and second monomers having different refractive indices; and (b) allowing the monomer mixture to polymerize so that initially the first monomer polymerizes preferentially causing the second monomer to coagulate, and subsequently, as the first monomer is consumed, the second monomer polymerizes preferentially, the curved, plate-shaped, rod-shaped, cone-shaped or spherical polymer material having a correlation distance "a" in the range of $0.07 \text{ μm} \leq a \leq 50 \text{ μm}$ and an effective scattering irradiation parameter E in the range of $0.45 \text{ cm}^{-1} \leq E \leq 80 \text{ cm}^{-1}$.

18. A light guide according to claim 17, wherein the effective scattering irradiation parameter E is in the range of $0.45 \text{ cm}^{-1} \leq E \leq 50 \text{ cm}^{-1}$.

* * * * *

UNITED STATES PATENT AND TRADEMARK OFFICE
CERTIFICATE OF CORRECTION

PATENT NO. : 5,542,017
DATED : July 30, 1996
INVENTOR(S) : Yasuhiro KOIKE It is certified that error appears in the above-identified patent and that said Letters Patent is hereby corrected as shown below:

<u>Col. 6</u>, line 8, change "$\{n_1 - n_2|$" to --$|n_1 - n_2|$--.

<u>Col. 8</u>, line 38, change " $<\eta^2<=\Phi_A\Phi_B(n_A^2-n_B^2)$ " to

-- $<\eta^2>=\Phi_A\Phi_B(n_A^2-n_B^2)^2$ --.

<u>Col. 14</u>, line 45, change "$11 \times 10^{-7}$" to --$1.1 \times 10^{-7}$--.

<u>Col. 17</u>, line 30, delete "linear,".

<u>Col. 18</u>, line 15, change "B" to "E";

Signed and Sealed this

Eighteenth Day of February, 1997

Attest:

BRUCE LEHMAN

*Attesting Officer*   *Commissioner of Patents and Trademarks*